March 27, 1945.  L. B. CAMPBELL  2,372,473
LINK AND CHAIN FORMING MECHANISM
Original Filed April 22, 1942  4 Sheets-Sheet 1

INVENTOR
L. BARRETT CAMPBELL
BY
ATTORNEY

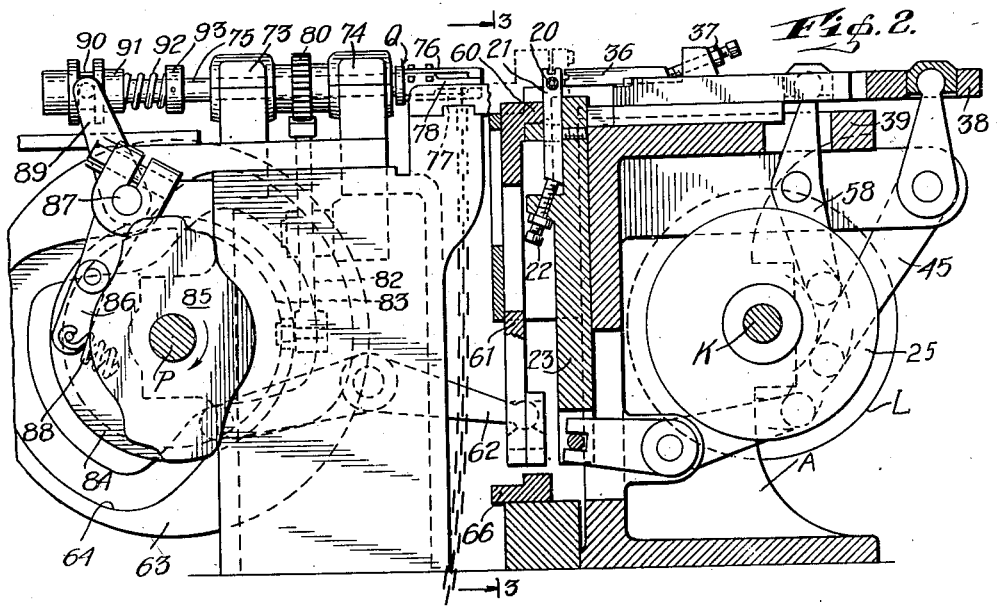
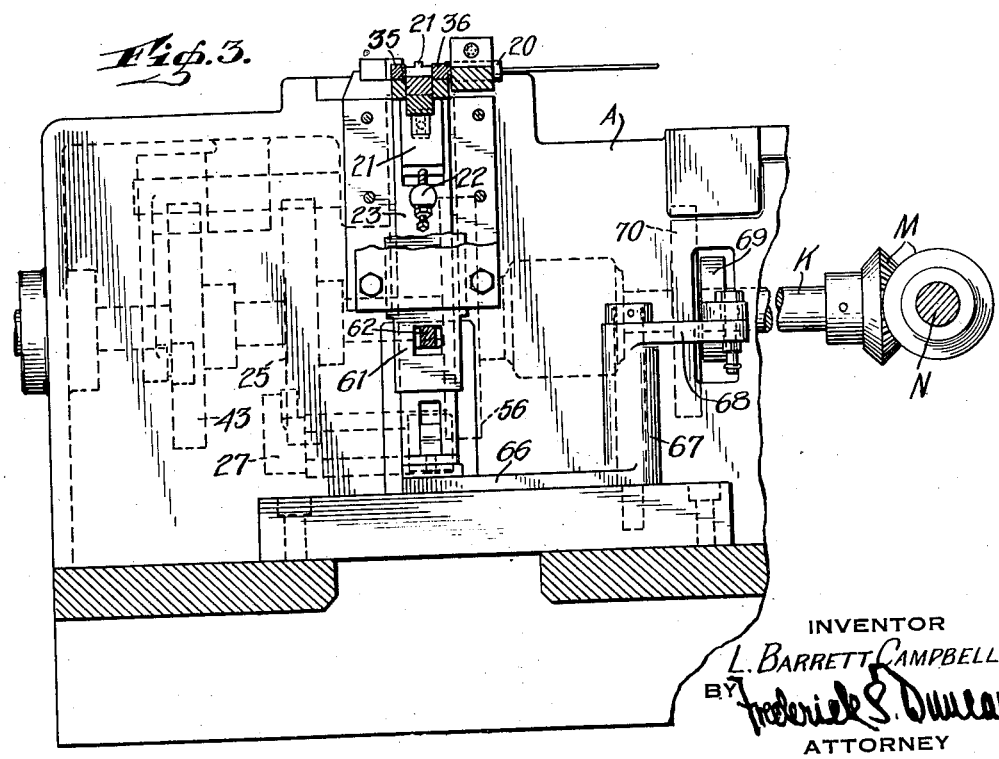

March 27, 1945. L. B. CAMPBELL 2,372,473
LINK AND CHAIN FORMING MECHANISM
Original Filed April 22, 1942 4 Sheets-Sheet 3
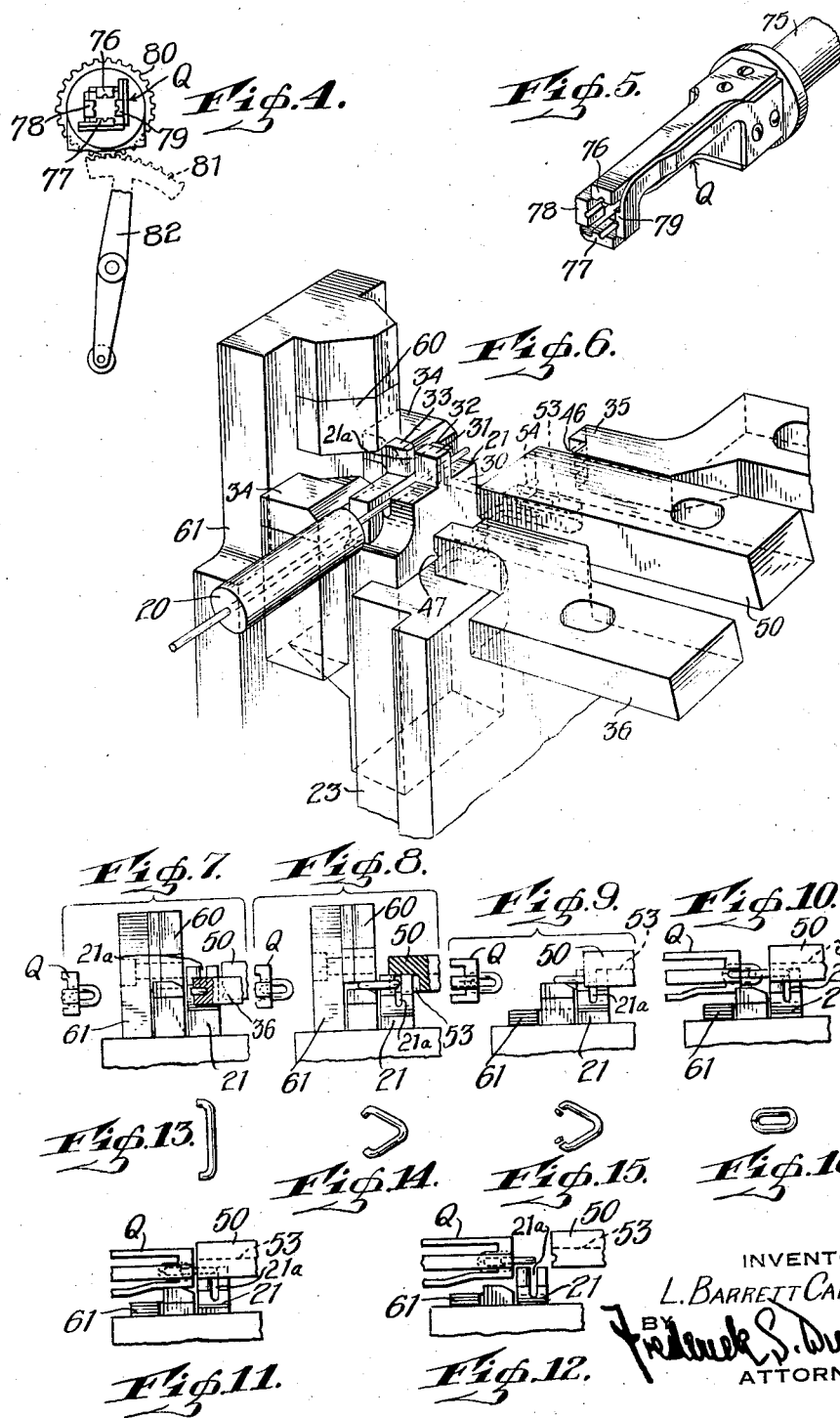
INVENTOR
L. BARRETT CAMPBELL
BY
ATTORNEY March 27, 1945.   L. B. CAMPBELL   2,372,473
LINK AND CHAIN FORMING MECHANISM
Original Filed April 22, 1942   4 Sheets-Sheet 4

INVENTOR
L. BARRETT CAMPBELL
BY
Frederick S. Duneau
ATTORNEY

Patented Mar. 27, 1945

2,372,473

UNITED STATES PATENT OFFICE 2,372,473

LINK AND CHAIN FORMING MECHANISM

Lyman Barrett Campbell, Waterbury, Conn., assignor to American Chain & Cable Company, Inc., Bridgeport, Conn., a corporation of New York Original application April 22, 1942, Serial No. 440,081. Divided and this application November 13, 1942, Serial No. 465,813

11 Claims. (Cl. 59—27)

This invention relates to a chain link forming mechanism, the preferred form of which is disclosed in my parent application, Ser. No. 440,081, filed April 22, 1942.

The principal object of this invention is the provision of an improved chain link mechanism for forming links and connecting them in a chain in a continuous operation and at a high rate of speed.

Other objects of this invention will appear from the following description taken in connection with the drawings in which—

Fig. 2 is a vertical longitudinal section through the machine on the line 2—2 of Fig. 1;

Fig. 3 is a vertical transverse section on the line 3—3 of Fig. 2;

Fig. 4 is a front end view of the link handling fingers and the means for rotating the last formed link into position to receive the link being formed;

Fig. 5 is a perspective view of the link handling fingers;

Fig. 6 is a perspective view of the wire cutting, link forming, link trimming, and link closing mechanisms;

Fig. 7 shows the link handling fingers and the mechanism disclosed in Fig. 6 in the position they occupy after the wire cutting and the first forming operation;

Fig. 8 shows the position of the same parts after the second forming operation;

Fig. 9 shows the position of the same parts after the link trimming operation;

Fig. 10 shows the position of the same parts after the newly formed link has been closed and connected to the last formed link;

Fig. 11 shows the position of the same parts after the newly formed link has been seized by the link handling fingers;

Fig. 12 shows the king post or anvils lowered to clear the newly formed link to permit it to be withdrawn from the link forming region;

Fig. 13 shows the form of link produced by movement of the parts into the positions shown in Fig. 7;

Fig. 14 shows the form of link produced by movement of the parts into the position shown in Fig. 8;

Fig. 15 shows the link after the trimming operation has been performed by movement of the parts into the positions shown in Fig. 9;

Fig. 16 shows a closed link which is closed as the parts are moved into the position shown in Fig. 10;

The machine disclosed in my parent application comprises wire straightening mechanism, wire feeding mechanism, wire check feed mechanism, link forming and link closing mechanisms, and link welding mechanism, all correlated so as to automatically produce a finished welded chain from wire stock. All of the parts of the machine are shown at substantially 30° in the cycle of operation in the various figures except in Figs. 7 to 12 where they are shown in further advanced positions in the cycle as will be explained later.

In my parent application I claim the chain forming and welding mechanisms.

The frame A of the machine includes various platforms and standards on which the various elements of the machine are suitably supported and journaled. Suitably supported and journaled on the right-hand of the machine frame is a shaft K Figs. 1, 2 and 3 which may be driven from a source of power not shown, through a pulley L Figs. 1 and 2. This shaft through gears M Figs. 1 and 3 drives a transverse shaft N at the same rate of speed and this latter shaft through gears O Fig. 1 drives a shaft P Figs. 1 and 2 paralleling the shaft I at half the rate of speed of the latter. The various elements of the link and chain forming mechanism are driven through cams mounted on shafts K and P.

Figure 20:
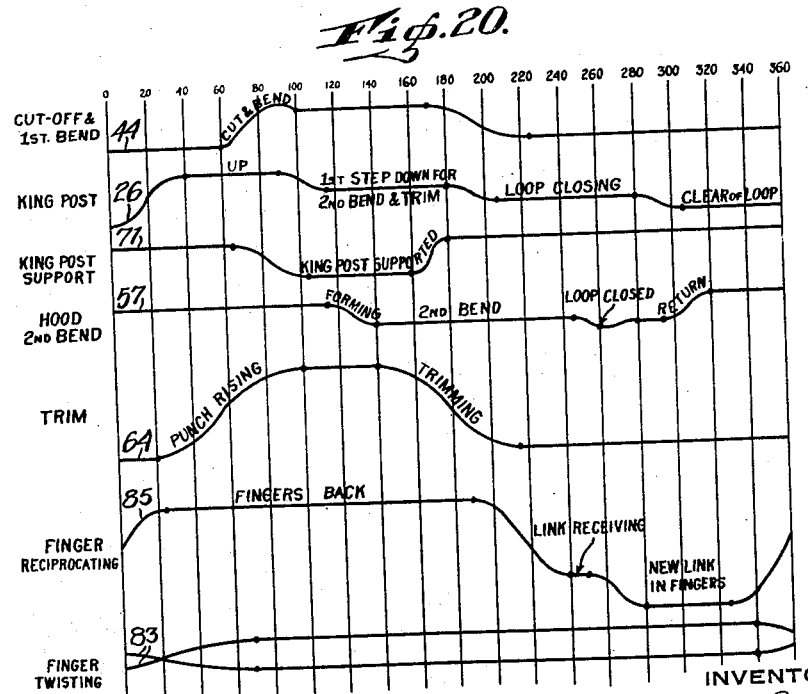
Fig. 20 is a timing or cam groove diagram.

Fig. 20 shows the cam grooves of the various cams developed with respect to one cycle of operation of the machine starting from the beginning of the cycle, showing the entire lengths of the cam surfaces of the cams mounted on the shaft K and one half of the length of the cam surfaces of the cams mounted on the shaft P. This figure shows the timing relation of the various cam surfaces and will be referred to as the description continues.

Figure 1:
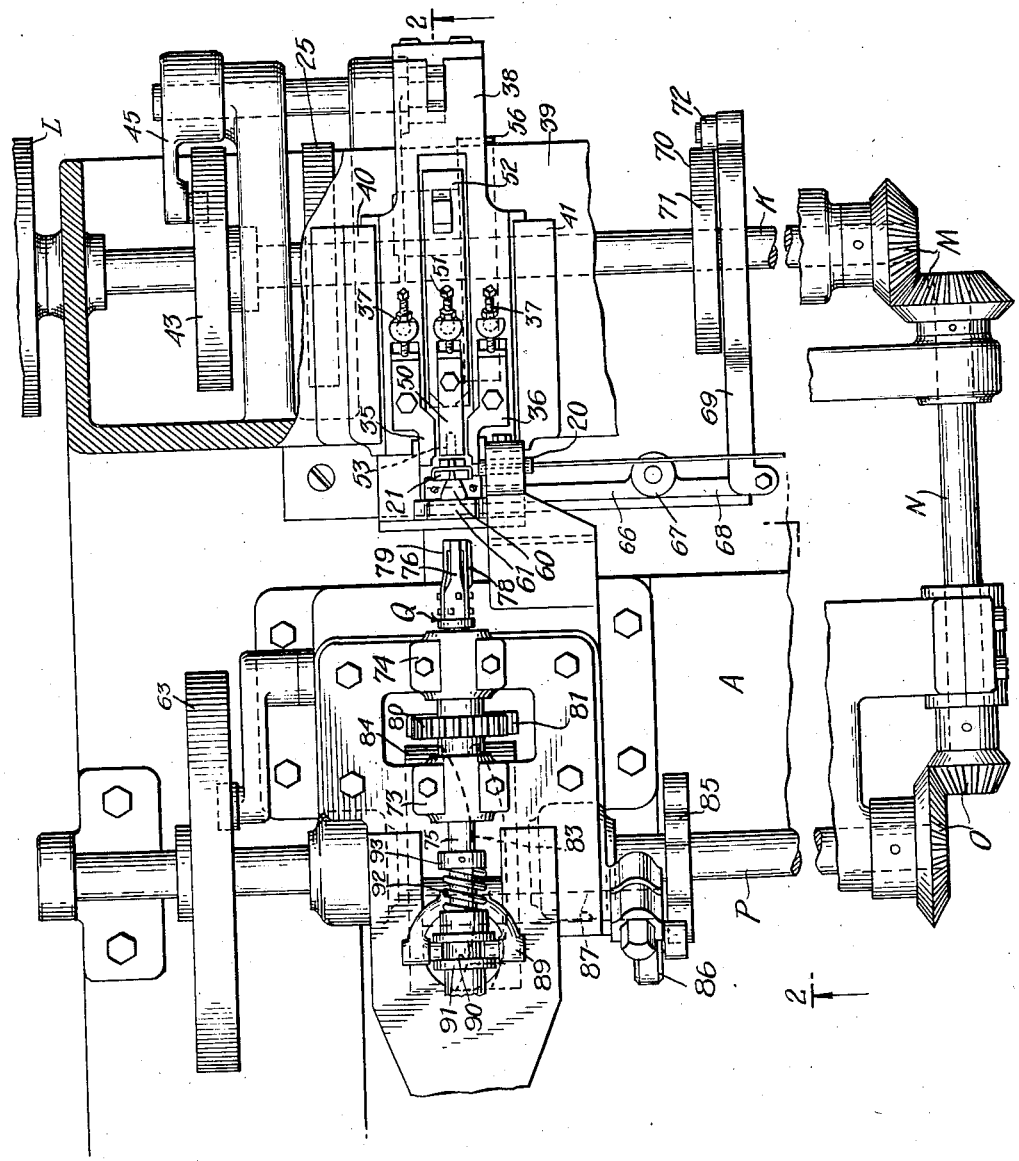
Fig. 1 is a top plan view of a machine constructed in accordance with my invention.

The wire is fed forwardly by any suitable means such as that disclosed in my parent application, through a cutoff bushing 20 Figs. 1 and 3 which is adjustably clamped in position on the frame of the machine by suitable clamping means as indicated.

Figure 18:
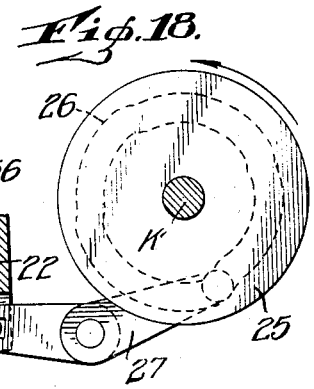
Fig. 18 is a side view of the king post or anvil operating cam and lever.

The length of wire fed forwardly during each feeding operation is slightly greater than the length of wire in a completed link and as disclosed more particularly in Fig. 6 the forward end of the wire is fed through a groove 21a in the upper end of a king post or forming post which comprises a hardened block 21 adjustably mounted as indicated at 22 Figs. 2 and 3 on an operating slide 23 operated by a box cam 25 Figs. 1, 3 and 18 mounted on the cam shaft K and provided with a groove 26 receiving a roll on one end of a bell crank construction 27 suitably pivoted on the frame of the machine. The cam groove is shaped, see also Fig. 20, so that it will raise the king post to its highest position at the beginning of the cycle of operation of the machine and then lower the king post step by step at spaced intervals for reasons that will appear later in the description.

In Fig. 6 the king post is shown in its raised position at approximately 30° in the cycle of operation. The groove 21a divides the king post block into two sections, one of which comprises a lower relatively wide portion 30 and an upper narrow portion 31 the function of which will be referred to later. The other section comprises a lower wide anvil 32 of a width slightly less than twice the inside length of the link to be formed and an upper narrow anvil 33 which is of a width equal to the inside width of the link to be formed. The king post block 21 also supports spaced trimming dies 34 later referred to, for trimming the ends of a link before it is closed. When the machine is at rest at the beginning of a cycle, the king post will be in its lowermost position, see Fig. 20.

Figure 19:
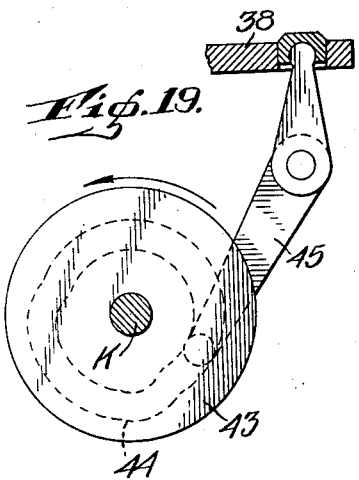
Fig. 19 is a side view of the first former and cutoff operating cam and lever.

Mounted for cooperation with the lower wide anvil 32 is a pair of forming dies 35 and 36 Figs. 1, 3, 6 and 7 which are adjustably mounted as indicated at 37 on the laterally spaced legs of a slide 38, see also Fig. 19, slidably retained on the platform 39 by overhanging guides 40 and 41. The slide 38 is operated by means of a box cam 43, Fig. 19, mounted on the shaft K and provided with a cam groove 44, which cooperates with a roll on the lower arm of a bell crank 45, which has its upper arm pivotally engaging the slide. The cam groove 44, see also Fig. 20, is shaped so as to move the forming dies 35 and 36 forwardly to their extreme forward position and then to slightly move them rearwardly and later in the operation after the link has been engaged by a second forming die, to move them to their extreme rear position. The forward ends and inner sides of the dies 35 and 36 are provided with wire receiving grooves 46 and 47. The outer corner of the die 36 cooperates with the cutoff bushing 20 to cut off the wire.

Figure 17:
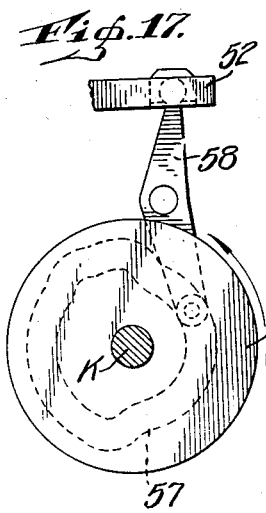
Fig. 17 is a side view of the hood or second former operating cam and lever.

Mounted for cooperation with the upper narrow anvil 33 is a hood or forming die 50 Figs. 1 and 6 to 12 adjustably mounted as indicated at 51 on a slide 52, also see Fig. 17, supported on the platform 39. The forming die 50 is provided with a recess 53 to clear the narrow portion 32 on the block 21. The forward end of the die 50 and the side walls of the recess are provided with grooves 54 to receive the partially formed link. This slide is operated by a box cam 56, Fig. 17, provided with a cam groove 57 in which operates a roll carried by one arm of a lever 58, the other arm of which has a pivotal engagement with the slide 52. The cam groove is so shaped, see also Fig. 20, that the hood will be moved forwardly to perform a second link bending operation and then after the link has been trimmed, moved forwardly to its most forward position to complete the link bending operation and to close the link, and then it will be partly withdrawn and finally moved back to its rearmost position which position it occupies when the machine is at rest.

Cooperating with the trimming dies 34, Figs. 6 to 12, is a punch 60 carried by a slide 61, see also Figs. 1, 2 and 3, which is reciprocated by a lever 62 suitably pivoted on the frame of the machine and operated by a double box cam 63 on the shaft P. This box cam is provided with a cam groove 64 shaped as shown in Figs. 2 and 20 to operate the trimming die twice during each rotation of the shaft P and once during each cycle of operation of the machine. The cam is timed to operate after the second forming operation.

The king post slide 23 is supported during the trimming operation by an arm 66, Figs. 1, 2 and 3, provided with a raised portion adapted to be moved under the king post slide. This arm is formed on the lower end of a hub 67 Fig. 3 suitably pivoted on the frame. The upper end of the hub is provided with an arm 68, to which is pivoted a slide 69 provided with a wide slot to receive the shaft K. The side walls of the slot may slide in a groove on the hub of a face cam 70 which is provided with a cam face 71 engaged by a roll 72 on the slide 69, the roll being held in contact with the face of the cam by a spring not shown. The mechanism so far described will form and close links and provision is made so that the newly formed link as it is being closed is connected to the last formed link. This mechanism comprises link handling mechanism.

For the purpose of holding the last formed link and for presenting it to the link forming mechanism at the time the newly formed link is closed, I provide an improved link handling mechanism Q Figs. 1, 2, 4, 5, and 7 to 12 which is mounted for reciprocation toward and away from the link forming region and also for rotation for the purpose of turning the last formed link angularly into position so it may be engaged by the newly formed link as it is being closed. Supported in spaced uprights 73 and 74, Figs. 1 and 2, for rotation and axial movement is a shaft 75 which is provided at its end which is adjacent to the link forming mechanism with pairs of opposed spring fingers 76, 77 and 78, 79, see also Figs. 4 and 5. The fingers 77 and 79 are offset as disclosed in Fig. 5 to provide an opening through which the formed chain may leave the link handling fingers.

Mounted on the shaft 75 between the uprights 73 and 74 for rotation with the shaft and permitting relative axial movement of the shaft with respect thereto, is a gear 80, Figs. 1, 2 and 4, which is operated by a segmental gear or rack 81 on one end of a lever 82 suitably pivoted on the frame of the machine, the other end of which is provided with a roll engaging a groove 83 in a cam 84, see also Fig. 20, mounted on the shaft P. The cam groove is shaped to rock the shaft through an angle of 90° back and forth once during each rotation of the shaft P, that is, to rock 90° in one direction during one cycle of operation of the machine and 90° in the opposite direction during the next cycle. This is for the purpose of rocking the last formed link through an angle of 90° to present it to receive the link being formed. Fig. 20 shows the complemental halves of the cam groove 83 superimposed.

For the purpose of moving the shaft 75 axially so as to present the last formed link to the link forming mechanism and to seize the newly formed link and to withdraw it from the link forming region, there is provided a face cam 85, Figs. 1 and 2, which is mounted on the shaft P. The face of the cam is shaped, see also Fig. 20, to cause the shaft and link handling fingers to be moved to the right to present the last formed link in position to receive the link being formed and then to move the fingers further to the right to seize the newly formed link and then to move the fingers to the left to withdraw the newly formed link from the link forming region. Cooperating with the cam face of this cam is a roll on an arm 86 which is connected to a shaft 87 journaled in the frame of the machine. The roll is pressed against the face of the cam by means of a spring 88. Secured on the other end of the shaft 87 is a bifurcated arm 89 which is provided with pins which extend into a groove 90 in a sleeve 91 slidable and rotatable on the shaft 75. Motion is communicated from the sleeve 91 to the shaft 75 by means of a spring 92, interposed between and connected to the sleeve and a collar 93 pinned to the shaft.

Operation of the link forming mechanism

In the position of rest at the end of a cycle of operation of the machine the dies which cut off the wire and perform the first bending operation are in their rearmost position, the king post is in its lowermost position, the king post support is out of supporting position, the hood or die that performs the second and third bending operations is in its rearmost position, the trimming punch is in its lowermost position, and the link handling finger mechanism is in intermediate positions as to both reciprocating and turning movements.

As the machine is set in operation the reciprocating and turning movements of the link handling fingers are completed and then the wire is fed forward and the king post and block 21 are raised. This is the position of the parts shown in Fig. 6. The cutoff and forming dies 35 and 36 are then moved forward into the position shown in Fig. 7 producing the low wide U link form shown in Fig. 13. At this time the king post support is rocked into supporting position. The dies 35 and 36 are then moved slightly toward the rear and the king post is lowered to present the upper anvil 33 opposite the partially formed link. After the king post has been lowered as described, the hood 50 is moved forward into the position shown in Fig. 8 producing the partially formed link disclosed in Fig. 14. The trimming punch 60 is then lowered into the position shown in Fig. 9 to cut off the ends of the link as shown in Fig. 15 and then the king post support is withdrawn, after which the link handling fingers are moved forward into the position shown in Fig. 10. The hood 50 is moved forward to the extreme forward position disclosed in Fig. 10 during which movement it closes the link as shown in Fig. 16 connecting the newly formed link with the link formed during the preceding cycle of operation. The link handling fingers are then moved forwardly to seize the newly formed link which is held stationary by the narrow projecting portion 31 on the king post block 21. During this movement the previously formed link will be engaged by the upper narrow anvil 33 and will be pushed back through the fingers of the link handling mechanism as disclosed in Fig. 11. Following this operation the king post will be lowered and withdrawn from the newly formed link to permit the link handling mechanism to withdraw the newly formed link from the link forming region as disclosed in Fig. 12.

While a preferred form of my link and chain forming mechanism has been disclosed and described with particularity, it is to be understood that I reserve the right to all such changes and modifications as fall within the principles of my invention and the scope of the appended claims.

I claim:

1. In a link forming mechanism, an anvil of a width slightly less than twice the length of the interior of the link to be formed, an anvil of a width equal to the width of the interior of the link to be formed, forming dies for bending link material of sufficient length to form a link about said first mentioned anvil, and a forming die for bending the central portion of said length of material about the second mentioned anvil to complete the operation of forming and closing a link, means for operating all of said forming dies and for causing a pause in the movement of said second mentioned forming die after the link has been bent into a V-form, and means for presenting a formed link during said pause into position to be enmeshed by the link being formed as it is being closed.

2. In a link forming mechanism, an anvil of a width slightly less than twice the length of the interior of the link to be formed, an anvil of a width equal to the width of the interior of the link to be formed, forming dies for bending link material of sufficient length to form a link about said first mentioned anvil, a forming die for bending the central portion of said length of material about the second mentioned anvil to complete the operation of forming and closing a link, means for operating all of said forming dies and for causing a pause in the movement of said second mentioned forming die after the link has been bent into V form, means for trimming the ends of the partially formed V-form link during said pause, and means operating during said pause for presenting a formed link into position to be coupled with the newly formed link during the resumption of operation of said second mentioned forming die closing said V-form link.

3. In a link forming mechanism, the combination of a forming post divided into two sections by a groove to receive link material, one section of said post comprising a lower wide anvil and an upper narrow anvil and the other section of said post comprising a lower wide link material backing portion and an upper narrow link backing portion, means for bending the link material around the wide anvil, means for presenting the partially formed link to the upper narrow anvil, and means for bending and closing the partially formed link about the upper anvil and connecting it with a formed link.

4. In a link forming mechanism, the combination of a forming post divided into two sections by a groove to receive link material, one section of said post comprising a lower wide anvil and an upper narrow anvil and the other section of said post comprising a lower wide link material backing portion and an upper narrow link backing portion, means for bending the link material around the wide anvil, means for presenting the partially formed link to the upper narrow anvil, means for forming and closing the link about the upper anvil and connecting it with a formed link, spring finger means for suporting the last formed link, means for operating said finger means to move said formed link into position for connection with the newly formed link as it is being formed and for moving said finger means to seize the newly formed link, and means for relatively moving said newly formed link and said latter mentioned anvil to permit said newly formed link to be withdrawn by said finger means.

5. In a link forming mechanism, the combination of a movable slide provided with link forming anvils for bending link material into a shallow wide U and for bending said shallow wide U into V-form, a movable trimmer cooperating with said first mentioned slide for cutting off the extreme ends of said V-form link, means for withdrawing said trimmer, means for presenting a formed link in position to be connected with the link being formed, means for closing said link being formed, means for advancing said link presenting means to seize the newly formed link and means for withdrawing said anvils to permit withdrawal of said newly formed link from link forming position.

6. In a link forming mechanism, the combination of a movable slide provided with link forming anvils for bending link material into a shallow wide U and for bending said shallow wide U into a V, spaced dies supported by said slide in position near the extreme free ends of said V, supporting means for said slide, a movable trimmer cooperating with said dies, means for moving said trimmer toward said dies and for withdrawing said trimmer and said supporting means, means for presenting a formed link in position to receive the link being formed, means for closing the link, means for advancing the link presenting means to seize the newly formed link, and means for withdrawing said anvils to permit withdrawal of said newly formed link from link forming position.

7. In a link forming mechanism, the combination of a forming post provided with a lower wide anvil and an upper narrow anvil, a pair of laterally spaced forming dies movable to cooperate with said lower wide anvil for bending link material into a low wide U, said forming dies being provided with grooves receiving said link material and the partially formed link, means slightly withdrawing said forming dies to provide clearance permitting said king post to be lowered to present said narrow anvil opposite said partially formed link, and a forming die interposed between said first mentioned forming dies and movable to cooperate with said narrow anvil to complete the forming of said link.

8. In a link forming mechanism, the combination of a forming post provided with a lower wide anvil and an upper narrow anvil, a pair of laterally spaced forming dies movable to cooperate with said lower wide anvil for bending link material into a low wide U, means for lowering said forming post to present said narrow anvil opposite the partially formed link, spaced trimming dies supported by said forming post having their upper faces and cutting edges lying in a plane passing through the upper narrow anvil, a third forming die interposed between said first mentioned forming dies movable to cooperate with said upper narrow anvil to bend said partially formed link into the form of a V with its ends resting on and projecting over said cutting edges of said trimming dies, and a vertically reciprocating trimming die movable downwardly to cooperate with said cutting edges for trimming the ends of said link of V-form.

9. In a link forming mechanism, the combination of a forming post provided with a lower wide anvil and an upper narrow anvil, a pair of laterally spaced forming dies movable to cooperate with said lower wide anvil for bending link material into a low wide U, means for lowering said forming post to present said narrow anvil opposite the partially formed link, spaced trimming dies supported by said forming post having their upper faces and cutting edges lying in a plane passing through the upper narrow anvil, a third forming die interposed between said first mentioned forming dies movable to cooperate with said upper narrow anvil to bend said partially formed link into the form of a V with its ends resting on and projecting over said cutting edges of said trimming dies, a vertically reciprocating trimming die movable downwardly to cooperate with said cutting edges for trimming the ends of said link of V-form, and an arm adapted to move under said forming post to support the same during the link trimming operation.

10. In a link forming mechanism, the combination of a forming post provided with a lower wide anvil and an upper narrow anvil, a pair of laterally spaced forming dies movable to cooperate with said lower wide anvil for bending link material into a low wide U, means for lowering said forming post to present said narrow anvil opposite the partially formed link, spaced trimming dies supported by said forming post having their upper faces and their cutting edges lying in a plane passing through the upper narrow anvil, a third forming die interposed between said first mentioned forming dies movable to cooperate with said upper narrow anvil to bend said partially formed link into the form of a V with its ends resting on and projecting over said cutting edges, a vertically reciprocating trimming die movable downwardly to cooperate with said cutting edges for trimming the ends of said link of V-form, an arm adapted to move under said forming post to support the same during the link trimming operation, means for moving said arm under said forming post before said link trimming operation and then moving said arm into inoperative position after said link trimming operation, means for moving said vertically reciprocating trimming die out of the path of said third forming die, and means for moving said third forming die to close said link.

11. In a link forming mechanism, the combination of a forming post provided with a lower wide anvil and an upper narrow anvil, a pair of laterally spaced forming dies movable to cooperate with said lower wide anvil for bending link material into a low wide U, means for lowering said forming post to present said narrow anvil opposite the partially formed link, spaced trimming dies supported by said forming post having their upper faces and their cutting edges lying in a plane passing through the upper narrow anvil, a third forming die interposed between said first mentioned forming dies movable to cooperate with said upper narrow anvil to bend the partially formed link into the form of a V with its ends resting on and projecting over said cutting edges, a vertically reciprocating trimming die movable downwardly to cooperate with said cutting edges for trimming the ends of said link of V-form, an arm for supporting said forming post during the link trimming operation, means for moving said arm under said forming post before said link trimming operation and then into inoperative position after said link trimming operation, and means for lowering said vertically reciprocating trimming die to trim said link of V-form and to a point below the path of travel of said third forming die, means for moving the last formed link into the opening between the ends of said partially formed link of V-form and means for moving said third forming die forwardly to close said partially formed link of V-form about said formed link.

L. BARRETT CAMPBELL.